July 14, 1953
C. E. MONNICH
2,645,242
VALVE
Filed April 11, 1952
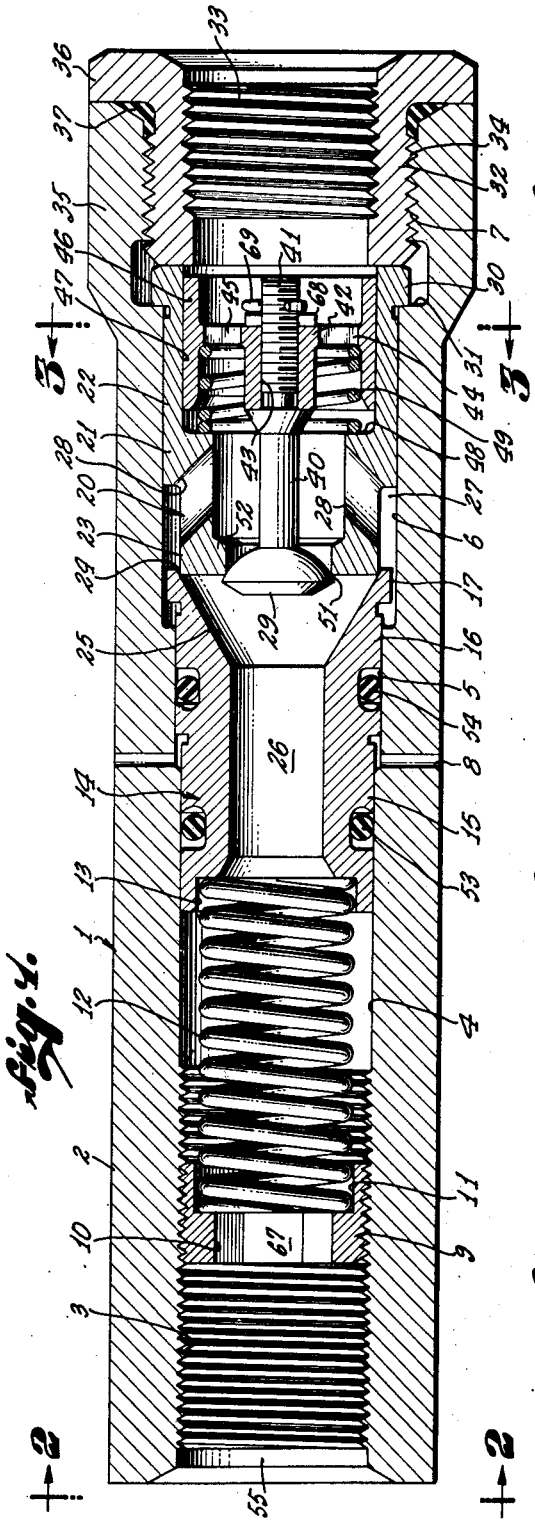
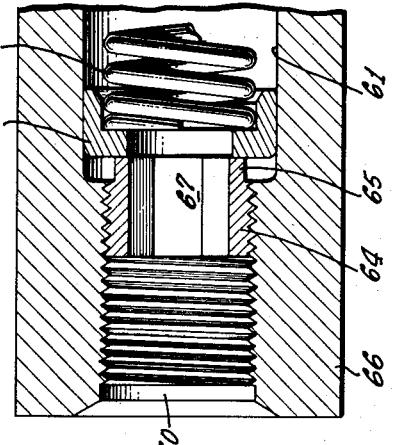
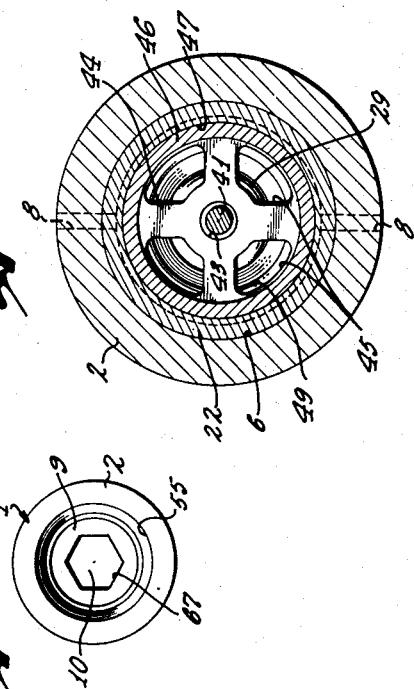
CARL EUGENE MONNICH,
INVENTOR.
BY
ATTORNEY.

Patented July 14, 1953

2,645,242

UNITED STATES PATENT OFFICE 2,645,242

VALVE

Carl E. Monnich, Burbank, Calif., assignor to Hydraulic Research & Mfg. Co. Inc., Burbank, Calif., a corporation of California Application April 11, 1952, Serial No. 281,809

9 Claims. (Cl. 137—493.9)

The invention relates to a valve, and more particularly to a priority valve which operates at a certain high fluid pressure to transmit the high pressure to certain hydraulic devices, while insuring that if there is a failure in the fluid pressure supply, priority is given to emergency items such as brakes connected in advance of the valve. For this purpose, the valve remains closed until the pressure is sufficient to supply the brakes or other priority items and also build up to a value sufficient to operate the valve.

The valve of this invention is particularly intended for use with a well-known four-way valve, whereby the valve of this invention supplies high-pressure fluid in one direction at certain times, or low pressure return flow in the opposite direction when the four-way valve is operated to exhaust the pressure fluid from the operated hydraulic devices. While various other values may be used, the valve is operated by low pressure such as 5 or 10 lbs., during return flow, whereas for high pressure flow the valve is operated by pressures of the order of 1500 lbs., p. s. i. During the high pressure flow, the valve will reseat at a 10% drop of its normal operating high pressure.

In co-pending application Serial Number 268,174, filed January 25, 1952, by J. D. Buchanan, for Valve, there is disclosed and claimed a priority valve wherein operation at both high and low pressures is obtained by a valve device operated by a single spring and wherein the valve casing and a valve member are machined to provide a plurality of parallel passages.

An object of the present invention is to simplify the manufacture of a priority valve and to provide a construction wherein separate springs are employed for high and low pressure operation respectively.

Ease of manufacture is obtained by providing a valve casing having a single through passage having cylinders graduated in sizes, the various valve parts being insertable into one end or the other end of the casing. Segregation of the spring functions is obtained by providing a hollow high pressure valve which controls a bypass around the low pressure valve, while the low pressure valve controls an exhaust passage through the high pressure valve.

A further object of the invention is to offset the increase in spring tension of the spring which urges the high pressure valve to closed position. This is accomplished by providing the high pressure valve with two piston areas, the smaller one of the two being sufficient, when the normal high pressure is reached, to overcome the spring and open the valve, the larger piston area becoming effective when the valve is open, to apply a larger opening force sufficient to offset the increase in spring tension due to its contraction.

A further object of the invention is to provide for accurate seating of the low pressure valve. As this valve operates on a low pressure, such as 5 or 10 lbs., its spring is comparatively weak and unless special precautions are taken, the valve may not seat accurately, as the seating force is low. This is overcome, according to the present invention, by providing the low pressure valve, which is of the poppet type, with an enlarged hollow stem which accurately guides the valve to its seat. This is maintained lubricated by the oil which constitutes the fluid handled by the valve.

For further details of the invention reference may be made to the drawings wherein Fig. 1 is a longitudinal, sectional view of a valve according to the present invention.

Fig. 2 is an end view looking in the direction of the arrows on line 2—2.

Fig. 3 is a sectional view on line 3—3 of Fig. 1 looking in the direction of the arrows.

Fig. 4 is a sectional view corresponding to the left end of Fig. 1, with parts broken away, showing a modified form of spring retainer for use when the high pressure inlet is smaller than the cylinder.

Referring in detail to the drawings, the combined high and low pressure valve 1 has an elongated cylindrical casing 2 having a single through passage which comprises a threaded bore 3 at the combined high pressure inlet and low pressure outlet, followed by a cylinder 4, a larger cylinder 5, a still larger cylinder 6, and a still larger bore having threads 7.

The cylinder 5 has a vent as indicated at 8. The threaded bore 3 has an adjustable nut 9 having a passage 10 there-through for fluid flow and having a socket 11 to serve as a retainer for one end of a helical compression spring 12, the other end of which is retained in a socket 13 at one end of the high pressure valve 14.

Valve 14 has a piston 15 which fits the cylinder 4, and a larger piston 16 which fits the cylinder 5, and a head 17 which is smaller than the cylinder 6.

The low pressure valve 20 comprises a cage 21 having an outer end 22 which fits the cylinder 6 and having an inner end 23 of reduced diameter smaller than the cylinder 6. The periphery of the outer end 3 forms a circular seat 24 for the internal conical valve head 25 on the high pressure valve 14. The hollow valve 25 merges with a through passage 26 for fluid flow in opposite directions through the valve 14. The seat 24 is larger than piston 15 by a small amount such as 1/15 of a square inch to provide an effective piston area to overcome spring 12 and open valve 14 at the high pressure such as 1500 lbs. p. s. i. In this case, the force of spring 12 is about 100 lbs. The piston 16 is larger than the seat 24 to provide an additional effective piston area such as .015 square inch to balance the increase in the force of spring 12 due to its change of length when valve 14 is open.

The space between cylinder 6 and the reduced end 23 provides a chamber 27. When valve 14 is open, due to high pressure, the fluid flows through passage 26 and chamber 27 and through one or more ports 28 which by-pass the low pressure poppet valve 29 which is closed at this time. From the ports like 28 the high pressure fluid flows through the cage 21 to the combined high pressure outlet and low pressure inlet in sleeve 32.

The cage 21 at its outer end has a flange 30 held to a shoulder 31 by the sleeve 32 which has internal threads 33 and external threads 34 to thread into the hub 35. The sleeve 32 has a flange 36 which overlies the end of hub 35 and a seal 37 is provided between the flange 36 and hub 35.

The poppet valve 29 has a steam 40, the outer end 41 of which has thread engagement with a hub 42 as shown at 43. Stem 41 has a suitable lock such as washer 68 and lock wire 69. Hub 43 is carried by a spider 44 to provide ports like 45 through which the fluid flows in one direction or the other. The spider 44 has a sleeve 46 which slides in a cylinder 47. Sleeve 46 is carried by the stem 41 and serves as a hollow stem for the low pressure valve 20. Between the spider 44 and a shoulder 48 is arranged a helical spring 49 which urges the valve head 29 to its seat 51 in the end wall 52 of the cage 21.

The piston 15 has a seal 53 and piston 16 has a seal 54.

As above described, high pressure oil supplied to the combined high pressure inlet and low pressure outlet 55 operates the valve 14 and flows through ports like 28 which by-pass valve 20 as it is closed at this time. When the four-way valve, not shown, is operated to exhaust, the pressure at 55 drops to atmospheric and the pressure at sleeve 32 is low such as 5 or 10 lbs. This opens valve head 29 for low pressure flow through valve 14 which remains closed for the reason that while valve 14 has an effective piston area, the fluid pressure during exhaust is so low that it is not effective to operate the valve 14.

From the drawing it is apparent that the valve 14 is substantially co-axial with valve 20 and cage 21, and that the casing 2 has a single through passage into which the valve 14 and cage 21 may be inserted through the hub 35. In the form shown in Fig. 1, the spring 12 can be inserted through either end of the casing 2.

In the form shown in Fig. 4, the combined high pressure inlet and low pressure outlet 60 is smaller than the cylinder 61, instead of being the same size as shown in Fig. 1, and in this case the cylinder 61 has a follower 62 for the spring 63, and the hollow nut 64 has an extension 65 which bears on the follower 62. In both Fig. 1 and Fig. 4, the spring 12 or 63 can be adjusted as the nuts 9 and 64 are both accessible from the adjoining end of the casing 2 or 66. To facilitate adjustment of the nut 9 or 64, the interior thereof is non-circular, viz., hexagonal, as shown in 67 in Fig. 2.

Various modifications may be made in the invention without departing from the spirit of the following claims.

I claim:

1. A valve comprising a casing having an inlet and an outlet, a hollow valve member between said inlet and outlet, said valve member having an inner piston of a certain size and having an outer piston of larger size and terminating in an internal conical valve head, said valve member having a passage there-through opening into said inlet and into said valve head, said casing having a seat of a size intermediate between the sizes of said pistons, and a spring operating on said valve member and urging said valve head to said seat.

2. A valve according to claim 1, said inlet serving also as a low pressure outlet and said first mentioned outlet serving also as a low pressure inlet, said seat having a reciprocating valve communicating with said outlet and opening into the space within said internal valve head, a spring urging said reciprocating valve to closed position, said seat having a by-pass for by-passing flow around said reciprocating valve when said hollow valve member is open, said spring for said reciprocating valve being weaker than said spring for said hollow valve member for passing low pressure flow through said hollow valve member when said reciprocating valve is open and said hollow valve member is closed.

3. A valve comprising a casing having a high pressure inlet and a high pressure outlet, said casing having a cylinder, a hollow valve having a piston for said cylinder, said hollow valve having a passage therethrough opening into said inlet and terminating in an internal conical valve head, a seat member having an annular seat tangent to and fitting in said conical valve head at a position intermediate the length of said conical valve head, a spring urging said valve head to its said seat, said seat being larger than said piston and providing an effective piston area exposed to fluid pressure in said inlet for operating said valve, said seat member having an outlet passage communicating with the exterior of said valve head and with said outlet.

4. A valve according to claim 3 and a piston on said hollow valve larger than said seat and exposed to fluid pressure flowing through said hollow valve when said hollow valve is open, whereby said hollow valve has a greater effective piston area when open than when closed on said seat.

5. A valve comprising a hollow casing having at one end thereof a combined high pressure inlet and low pressure outlet and at the other end thereof a combined high pressure outlet and low pressure inlet, said high pressure inlet opening into a first cylinder of a certain size and the same opening into a second cylinder of a larger size and the same opening into a third cylinder of still larger size, said third cylinder having a shoulder, a poppet valve cage having a flange fitting on said shoulder, said cage fitting in said third cylinder, said high pressure outlet having a thread bore having a thread sleeve for holding said flange on said shoulder, said cage having a reciprocating valve having a spring and the inner end of said cage having a reduced diameter terminating in an outer seat, a hollow valve having a piston for each of said first and second cylinders and having an internal conical valve head fitting on said outer seat, and a spring urging said valve head to said seat, said inner end of said cage having a seat for said reciprocating valve.

6. A valve according to claim 5, said casing being one piece of material, said hollow valve, said cage and said sleeve fitting into said casing through said other end of said casing.

7. A valve comprising a casing having an inlet and an outlet, said casing having a cylinder, a cage having an outer end fitting in said cylinder and having a reduced inner end, the periphery of said inner end comprising a seat, a hollow conical valve head embracing and fitting on said seat, said valve head having an internal passage communicating with said inlet, said reduced inner end having an end wall and a side wall, said end wall having a passage there-through providing a seat, a poppet valve head extending through said wall and fitting said last mentioned seat, said casing having a chamber at the outlet side of said peripheral seat, said side wall having a passage controlled by said conical valve head, said passage communicating with said chamber and said outlet, said cage having an internal cylinder at its outer end, a hollow stem slideably fitting said internal cylinder, said stem having a hub, a passage between said hub and said hollow stem, said poppet valve head having a stem fixed in said hub, and a spring for urging said poppet valve head to its said seat.

8. A valve comprising a casing having at one end thereof a combined high pressure inlet and low pressure outlet and having at the other end thereof a combined high pressure outlet and low pressure inlet, said casing having a high pressure valve for controlling high pressure flow and a low pressure valve for controlling low pressure flow in the opposite direction, said casing having a cylinder, said high pressure valve comprising a piston for said cylinder, a comparatively strong spring urging said piston towards said combined low pressure inlet and high pressure outlet to close said high pressure valve at certain times, said piston communicating with said high pressure inlet for opening said high pressure valve at other times, said high pressure valve comprising a valve head on said piston and a cooperating seat on said low pressure valve, said casing having a chamber at the high pressure outlet side of said seat and said low pressure valve having a seat member having a passage there-through communicating with said chamber and with said high pressure outlet, said low pressure valve comprising a reciprocating valve member having a valve head and a cooperating seat on said seat member, said low pressure valve having a comparatively weak spring urging said low pressure valve closed for flow towards said combined high pressure outlet and low pressure inlet, said low pressure valve head having a pressure area exposed to pressure in said low pressure inlet to urge said low pressure valve open at certain times.

9. A valve comprising a casing having an inlet and an outlet, a hollow valve member between said inlet and said outlet, said valve member having a hollow piston communicating with said inlet, said piston having a certain diameter adjoining said inlet and having a larger diameter on the outlet side of said first diameter, said piston of larger diameter terminating in an internal conical valve head, said casing having a seat fitting in said valve head, said seat having a passage communicating with said outlet when said valve head is open, a spring operating on said valve member and urging said valve head to said seat, and means for supplying to said inlet a pressure to act on the difference of the piston areas of said pistons and overcome said spring to open said valve head.

CARL E. MONNICH.

References Cited in the file of this patent

UNITED STATES PATENTS

| Number | Name | Date |
|---|---|---|
| 807,269 | Hildebrand | Dec. 12, 1905 |
| 1,115,582 | Saur | Nov. 3, 1914 |
| 2,139,395 | Walker | Dec. 6, 1938 |